US009838460B2

(12) United States Patent
Perez et al.

(10) Patent No.: US 9,838,460 B2
(45) Date of Patent: Dec. 5, 2017

(54) TOOL FOR SHARING APPLICATIONS ACROSS CLIENT DEVICES

(75) Inventors: Alberto Martin Perez, Kirkland, WA (US); Dave Iain MacLachlan, Redmond, WA (US); James Neil Weatherall, Kirkland, WA (US); Stephen John Konig, Newcastle, WA (US)

(73) Assignee: Google LLC, Mountain View, CA (US)

( * ) Notice: Subject to any disclaimer, the term of this patent is extended or adjusted under 35 U.S.C. 154(b) by 1253 days.

(21) Appl. No.: 13/482,746

(22) Filed: May 29, 2012

(65) Prior Publication Data

US 2015/0200975 A1 Jul. 16, 2015

(51) Int. Cl.
*G06F 15/16* (2006.01)
*H04L 29/08* (2006.01)
*H04L 29/06* (2006.01)

(52) U.S. Cl.
CPC .......... *H04L 67/025* (2013.01); *H04L 67/104* (2013.01); *H04L 67/141* (2013.01); *H04L 65/4069* (2013.01)

(58) Field of Classification Search
CPC ... H04L 67/025; H04L 67/104; H04L 67/141; H04L 65/4069
USPC .......................................... 709/204, 206, 228
See application file for complete search history.

(56) References Cited

U.S. PATENT DOCUMENTS

| | | | | |
|---|---|---|---|---|
| 9,332,052 B2 * | 5/2016 | Piegay | .................. | H04L 65/608 |
| 2006/0031170 A1 * | 2/2006 | Septon | ............................. | 705/59 |
| 2006/0053380 A1 * | 3/2006 | Spataro | ............. | G06F 17/30011 715/753 |
| 2008/0112417 A1 * | 5/2008 | Hamamoto | ....... | H04L 29/12509 370/395.54 |
| 2009/0024948 A1 * | 1/2009 | Anka | ............................ | 715/771 |
| 2009/0182814 A1 * | 7/2009 | Tapolcai et al. | .............. | 709/205 |
| 2010/0185455 A1 * | 7/2010 | Miller | ................. | H04L 67/2814 705/1.1 |
| 2010/0316028 A1 * | 12/2010 | Allen | .................... | H04W 76/02 370/336 |
| 2011/0279634 A1 * | 11/2011 | Periyannan et al. | ....... | 348/14.09 |
| 2011/0294474 A1 * | 12/2011 | Barany | ................ | H04W 8/005 455/414.1 |

(Continued)

OTHER PUBLICATIONS

Virtual desktops for less [online], [retrieved on Jul. 19, 2012]. Retrieved from the Internet:< URL: http://www.citrix.com/English/ps2/products/product.asp?contentID=2316437&ntref=prod_cat>.

(Continued)

*Primary Examiner* — Bryan Lee
*Assistant Examiner* — Oluwatosin Gidado
(74) *Attorney, Agent, or Firm* — McDermott Will & Emery LLP

(57) ABSTRACT

Described herein are techniques related to sharing applications between two client devices assigned to the same user. This Abstract is submitted with the understanding that it will not be used to interpret or limit the scope and meaning of the claims. A shared-application tool allows a user to request to use an application that is installed on host computing device on a client computing device. The request to use the application is made to a directory service using a message-exchanging protocol. The application is run on the host computing device and provided to the client computing device using a peer-to-peer communication protocol.

27 Claims, 5 Drawing Sheets

(56) References Cited

U.S. PATENT DOCUMENTS

| | | | | |
|---|---|---|---|---|
| 2012/0030341 A1* | 2/2012 | Jensen | ............... | H04L 67/2804 709/224 |
| 2012/0069131 A1* | 3/2012 | Abelow | ................... | 348/14.01 |
| 2012/0265803 A1* | 10/2012 | Ha | ................... | G06F 17/30283 709/203 |
| 2013/0311577 A1* | 11/2013 | Foreman et al. | ............. | 709/206 |
| 2014/0380137 A1* | 12/2014 | Zhang et al. | ................ | 715/202 |

OTHER PUBLICATIONS

Julie Bort, We're Blown Away: This Startup Could Literally Change the Entire Software Industry. Business Insider [online], Mar. 5, 2012 [retrieved on Jul. 19, 2012]. Retrieved from the Internet< URL: http://www.businessinsider.com/were-blown-away-this-startup-could-literally-change-the-entire-software-industry-2012-3>.

* cited by examiner

TOOL FOR SHARING APPLICATIONS ACROSS CLIENT DEVICES

BACKGROUND

User devices such as laptops, desktops, tablets, smartphones, and the like, install and run applications such as word processing applications, computer-aided drafting applications, graphic design applications, email applications, video game applications, and photo editing applications, etc., every day. However, at any given time only one or two devices may be actually running a given application.

SUMMARY

In general, one implementation of the subject matter disclosed herein is directed to a shared-application tool. The shared-application tool includes a directory device that is configured to register, via a message-exchanging communication protocol, a client computing device, a host computing device, and an application that is installed on the host computing device. The directory device also is configured to obtain a request from a user of the client computing device to use the application that is installed on the host computing device.

The shared-application tool includes a peer-to-peer communication interface that is configured to facilitate a peer-to-peer connection between the client computing device and the host computing device. The peer-to-peer communication interface uses a peer-to-peer communication protocol.

The shared-application tool includes a remote access component that is configured to enable, using the peer-to-peer connection, the user to use the application on the client computing device while the application is running on the host computing device.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
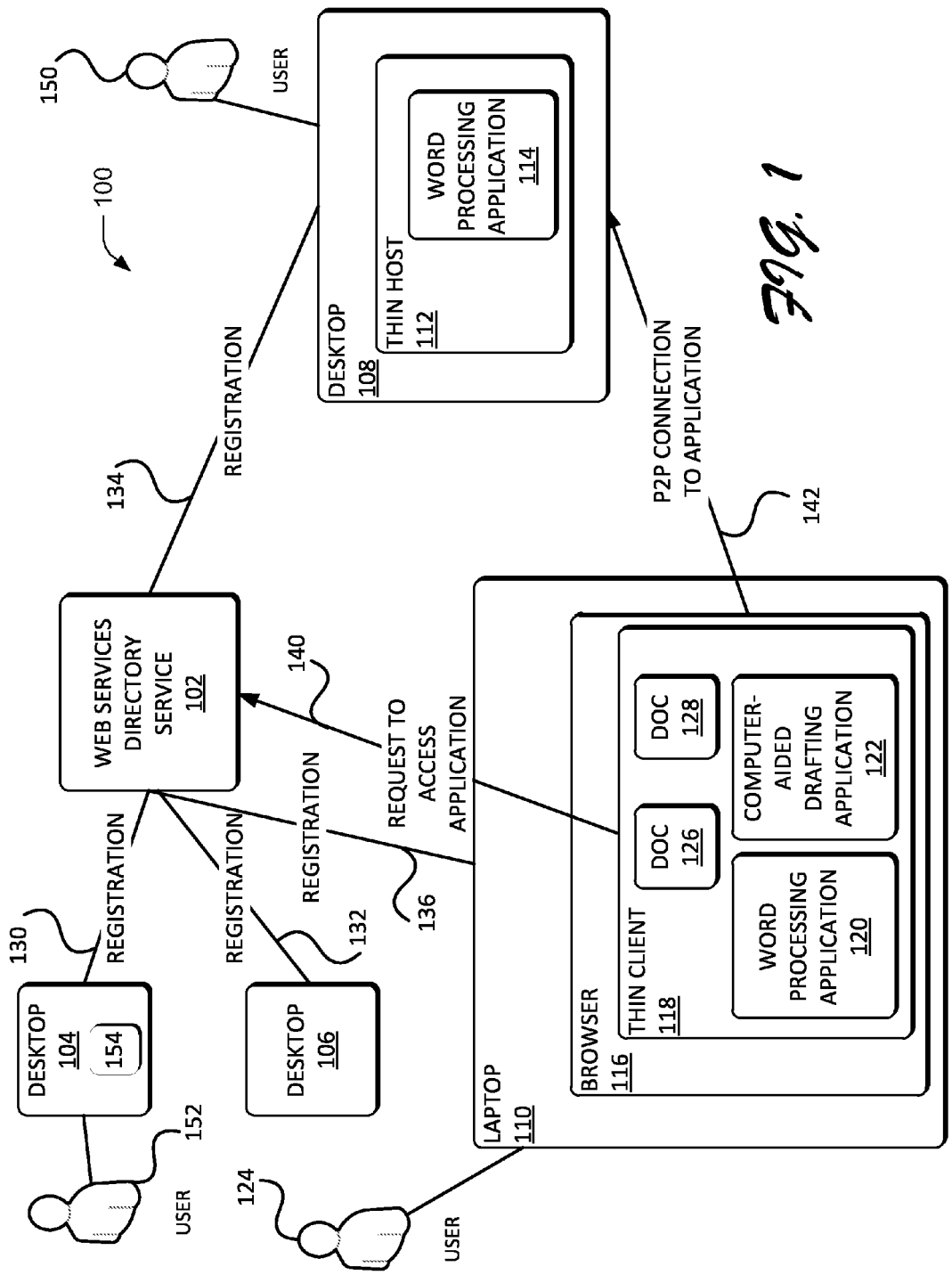
FIG. 1 illustrates an example application-sharing environment according to one or more implementations described herein.

The technology described herein is directed to a shared-application tool that keeps track of a user's devices and the applications that the user has permission to access. The shared-application tool permits an application that is installed on a host device to run on a client device even though the application is not installed on the client device. The client devices, host devices, and applications use a message-exchanging protocol, such as Extensible Messaging and Presence Protocol (XMPP), to register with a directory service. The directory service receives a request from the client device to use an application that is installed on one or more host devices. The client device and host device use a peer-to-peer communication protocol to permit the client device to use the selected application while the selected application is running on the host device.

The shared-application tool is installed on the client and/or host devices, such as a desktop computer, as well as on a directory service. In an example implementation, after the client devices and host devices, and their respective applications are registered with the directory service, a user opens the browser on his client device. The screen on the client device displays applications to the user. The user clicks on an icon for a specific application. Clicking on the icon starts a process to verify the user's permission to access the selected application and the host device where the selected application is installed.

When user permission is verified, the directory service provides the client device with an identifier for the host device, which the client device uses to set up a peer-to-peer communication session using a peer-to-peer communication protocol, such as libjingle, Skype, Teredo, another internet protocol version 6 (IPv6) peer-to-peer protocol, etc., with the host device. Once the peer-to-peer session has been established, the host device runs the selected application.

The host device has a remote access component, e.g., a video codec, which encodes captured user interface (UI) input, such as mouse movements, mouse clicks, key presses on the keyboard, etc., into a video stream and transmits the encoded video stream to the client device. The client device also includes a video codec, which decodes the encoded video stream and plays the mouse movements, mouse clicks, key presses on the keyboard, etc., that are in the decoded video stream.

The client device's video codec also encodes captured user interface (UI) input, such as mouse movements, mouse clicks, key presses on the keyboard, etc., into a video stream and transmits the encoded video stream to the host device. The host device decodes the encoded video stream.

In some implementations, the shared-application tool determines the best host device from which to run the selected application. For example, the shared-application tool takes into consideration central processing unit (CPU) capabilities, memory capabilities, network speed, device load, and other appropriate factors to optimize the location from which the selected application is run. If it is better to run the selected application from the host device rather than the client device, the shared-application tool will set up a peer-to-peer communication session between the host and the desktop computer and run the application from the desktop computer.

In some implementations, the shared-application tool permits licenses to be floated from one user to another. For purposes of explanation, suppose there are ten company licenses for an application and nine users already are actively using an application. When a new user opens up his web browser he sees the icon for the application on his user interface as an option and clicks on the icon. When a second new user opens up her web browser there is no icon for the application on her user interface because all ten licenses are taken. When one of the ten users stops using the application, the tenth license is now available. In one or more implementations, the shared-application tool informs the second new user that the application is now available for user (e.g., the icon for the application appears on the second new user's screen). The second new user clicks on the icon and is now the tenth user of the application.

Example Application-Sharing Environment

FIG. 1 illustrates an example application-sharing environment 100 in which a user of one computing device uses an application that is installed and running on another computing device according to one or more implementations described herein. The illustrated environment 100 includes a web services directory service 102, three desktop computers 104, 106, and 108, and a laptop computer 110. The illustrated desktop 108 includes a thin host 112.

The thin host 112 has access to a word processing application, as indicated by the icon 114. The word processing application may or may not be installed on the thin host 112. However, the presence of the icon 114 indicates that a user of thin host 112 can access the word processing application. Thin host 112 can be a web browser, a web browser plugin, or a browser extension. The browser extension can be created with web technologies. The browser extension can also include a native code module designed to run in a sandboxed environment directly on underlying hardware. The thin host 112 can also be a computer that has limited computing power, such as a computer terminal.

The illustrated laptop 110 includes a browser 116 and a thin client 118. The thin client 118 has access to the word processing application, as indicated by the icon 120, and a computer-aided drafting application, as indicated by an icon 122. The word processing application and/or computer-aided drafting application may or may not be installed on the thin client 118. However, the presence of the icons 120 and 122 indicates that a user of thin client 118 can access the word processing application and/or the computer-aided drafting application. The laptop 110 is assigned to a user 124. The desktop 108 is assigned to a user 150, and the desktop 104 is assigned to a user 152.

In this context, the term "assigned" is intended to mean that the user has undertaken action to demonstrate control and authority to manage the device. In that light, someone or something in the environment 100 has allocated one or more specific client devices (i.e., each with its own serial number) to a particular user. For example, an Information Technology (IT) professional in the environment 100 allocated the desktop computer 108 to one user and the laptop 110 to either the same user or another user.

The illustrated laptop 110 also includes an icon 126 for a word processing document and an icon 128 for a word processing document. The word processing documents may or may not be installed on the laptop 110. However, the presence of the icons 126 and 128 indicates that the user 124 of the laptop 110 has permission to access and edit the word processing documents represented by the icons 126 and 128.

In one or more implementations, the illustrated environment 100 is intended represent, among other things, any large multinational corporation, not-for-profit organization, government entity, and the like.

In one or more implementations, the directory service 102 is a service provided by a device that, stores, organizes, and provides access to information obtained from computing devices in the environment 100 during registration and subsequent use of the directory by the computing devices. As such, the directory service 102 includes one or more devices that perform the functions of registering computing devices. The directory service 102 also includes one or more devices that perform the functions of storing, organizing, and providing access to the information obtained from computing devices in the environment 100 during registration and subsequent use of the directory by the computing devices.

A suitable directory service includes an Amazon Web Services (AWS) directory service application programming interface (API) provided by Amazon, a Slicehost directory service API provided by Rackhost, a Linode directory service API provided by Linode, a Google App Engine directory service API provided by Google, and the like.

In one or more implementations, the desktop computers 104, 106, and 108 are personal computers that are intended to be stationary and not moved on a regular basis.

In one or more implementations, the laptop computer 110 is intended to represent any portable personal computer. This includes netbook computers, notebook computers, and tablet computers, subnotebook computers, and the like.

In one or more implementations, the thin host 112 accesses the directory service 102 via a browser (not shown).

In one or more implementations, the word processing application icon 114 is a picture or symbol that, when selected, navigates to an application that the icon represents. In the illustrated implementation, clicking on the icon 114 cause the desktop 108 to navigate to the word processing application that is installed in the application-sharing environment 100.

In one or more implementations, the browser 116 is a multi-process web browser that handles the user interface on the laptop 110 and manages other processes that run on top of the browser 116, such as one or more renderer processes, plugin processes, extension processes, and the like.

The thin client 118 accesses the directory service 102 via the browser 116. The thin client 112 also is intended to represent a computer that has limited computing power, such as a computer terminal. Thin client 118 can be a web browser, a web browser plugin, or a browser extension. The browser extension can be created with web technologies. The browser extension can also include a native code module designed to run in a sandboxed environment directly on underlying hardware.

In one or more implementations, the word processing application icon 120 is a picture or symbol that, when selected, causes the browser 116 to navigate to an application that the icon 120 represents. In the illustrated implementation, clicking on the icon 120 cause the browser 116 to navigate to the word processing application that is installed in the application-sharing environment 100.

In one or more implementations, the icon 122 is a picture or symbol that, when selected, causes the browser 116 to navigate to a computer-aided drafting application that the icon 122 represents. In the illustrated implementation, clicking on the icon 120 causes the browser 116 to navigate to the word processing application that is installed in the application-sharing environment 100.

Example Application-Sharing Environment Operation

In one or more implementations, the application-sharing environment 100 operates as follows. At a point 130, the desktop 104 registers with the directory service 102. At a point 132, the desktop 106 registers with the directory service 102. At a point 134, the desktop 108 registers with the directory service 102. At a point 136, the laptop 110 registers with the directory service 102 at point 136. Registration of the devices enables remote access to the devices. In one or more implementations, the desktops 104, 106, and 108, and the laptop 110 use a message-exchanging protocol, such as XMPP, to communicate with the directory service 102.

In one or more implementations, the desktops 104, 106, and 108 include a daemon that facilitates registration of the desktop 108. For example, the daemon reports to the directory service 102 the status of the desktop 108, e.g., the type of processor, the amount of memory, serial numbers, installed applications, whether the desktop 108 awake, reachable, etc. Once the desktop 108 has been registered, the directory service 102 adds the desktop 108 to the pool of user devices that are available for remote access.

In one or more implementations, the directory service 102 scans the Library/Applications files on the desktop computers 104, 106, and 108, and the laptop computer 110 looking for available applications, device specifications (e.g., processor speed, the amount of random access memory (RAM), device identifiers, etc.), and the like. In other implementations, directory service 102 scans the App/Data . . . /Program Files on the desktop computers 104, 106, and 108, and the laptop computer 110, looking for available applications (e.g., versions), device specifications (e.g., hardware specifications such as processor speed, the amount of random access memory (RAM), device identifiers, etc.) and the like. The directory 102 then creates a master list of whitelist applications. In determining whether an application is available for use by a user, the directory service 102 consults the whitelist of applications.

The directory service 102 keeps track of which applications are installed on which devices. The term "installed" is intended to mean that the user that is physically located in front of a client computing device can invoke and use the application without using the directory service 102. The IT department of the environment 100 typically installs applications on the individual devices. However, a user also may install applications on the client computing devices.

The directory service 102 also keeps track of which users have access to which applications. For instance, because the desktop 108 and the laptop 110 have registered with the directory service 102, the directory service 102 is aware that the thin host 112 has access to the word processing application, and that the thin client 118 has access to the word processing application and the computer-aided drafting application.

The directory service 102 also keeps track of the versions of applications that are installed on the registered devices. For example, if the user 124 requests to use the word processing application, the directory service 102 determines which version is appropriate. For example, the directory service 102 selects the latest version of the word processing application that exists on one or more of the computing devices in the environment 100, the version that the user 124 had been using, etc.

For purposes of illustration, suppose that the user 124 wishes to access the word processing application to use on the laptop 110. Also, for purposes of illustration, assume that the directory service 102 finds that the word processing application is installed on the desktop 108. At a point 140, the user 124 of the laptop 110 makes a request to the directory service 102 to access the word processing application. In one or more implementations, the user 124 selects the word processing application icon 120 on the laptop 110's user interface. In alternative implementations, the user 124 selects the word processing document icons 126 and/or 128 on the laptop 110's user interface.

Selecting the icons 120, 126, and/or 128 causes the laptop 110 and the directory service 102 to exchange messages, using XMPP for example, to facilitate establishment of a peer-to-peer connection between the laptop 110 and the desktop 108.

In one or more implementations, the daemon on the desktop 108 reports to the directory service 102 whether or not the desktop 108 has a port that can be connected to by the laptop 110 for a P2P communication session.

In one or more implementations, there is a relay server in between the laptop 110 and the desktop 108. In this context, the term "relay server" is intended to mean a server that relays messages back and forth between the desktop 108 and the laptop 110 in the event that there is no peer-to-peer communication session established or there is a peer-to-peer communication session established, but the desktop 108 and the laptop 110 are incompatible. The relay server ensures that the desktop 108 and the laptop 110 are communicating with each other at the same port.

For instance, some firewalls change the laptop 110 communication port number (e.g., 134) to another port number (e.g., 157) and sends port number 157 to the desktop 108. When the desktop 108 acknowledges the attempt to communicate with the laptop 110, the desktop 108 sends port number 157 back to the laptop 110. The relay server changes the port number 157 that it received from the desktop 108 to port number 134 so that the laptop 110 and the desktop 108 can communicate with each other.

Once the port numbers have been reconciled, at a point 142 the laptop 110 accesses the word processing application that is installed on the desktop 108 using a peer-to-peer communication protocol, such as Skype, libjingle, or other suitable peer-to-peer communication protocol. Using the peer-to-peer connection the desktop 108 runs the word processing application.

The desktop 108 has a remote access device, such as a video codec, for example, that encodes captured user interface (UI) input, such as mouse movements, mouse clicks, key presses on the keyboard, etc., into a video stream and transmits the encoded video stream to the laptop 110. The laptop 110 also includes a video codec, which decodes the encoded video stream and plays the mouse movements, mouse clicks, key presses on the keyboard, etc., that are in the decoded video stream.

The laptop 110's video codec also encodes captured user interface (UI) input, such as mouse movements, mouse clicks, key presses on the keyboard, etc., into a video stream and transmits the encoded video stream to the host device. The desktop 108 decodes the encoded video stream. In one or more implementations, the daemon on the desktop 108 maintains the peer-to-peer communication between the desktop 108 and the laptop 110 for the duration of the use of the word processing application by the laptop 110.

In the illustrated implementation, the desktop 108 is assigned to the user 150 and the desktop 104 is assigned to the user 152. For purposes of explanation, suppose that the application-sharing environment 100 has only two licenses for the word processing application. One is available for user on the user 124's desktop 108, as indicated by the icon 114, and the other is available for use on the user 150's desktop 108, as indicated by the icon 114. Suppose further that the user 152 wishes to use the word processing application as well.

In the illustrated implementation, the user 152 cannot currently use the word processing application on the desktop 104, as indicated by the desktop 104 not having an icon for the word processing application. The user 152 cannot currently use the word processing application on the desktop 104 because the two licenses are in use by the user 124 on the laptop 110 and the user 150 on the desktop 108.

In one or more implementations, one or both of the two registered licenses I unregistered from the laptop 110 and/or the desktop 108. When the user 124 and/or the user 150 closes out of the word processing application one of the licenses is released. The word processing application is unregistered from whichever device/user releases it.

The word processing application is then available for another user. In one or more implementations, an icon for the word processing application is presented on user devices that potentially have access to the word processing application. In the illustrated implementation, an icon 154 for the word processing application is displayed on the desktop 104. The user 152 can then click on the icon 154 to launch the word processing application. When the user 152 clicks on the icon 154, the second license is registered to the user 152 and icons on other devices are removed until the license is again unregistered and available for re-registration.

Although the illustrated environment 100 is shown with the desktops 104, 106, 108, and the laptop 110, the environment 100 also includes other computing devices that register with the directory 102 and make themselves available for remote access. For example, other suitable devices include any interactive video game console and/or handheld game console, such as Wii by Nintendo, the Xbox by Microsoft, the Sony PlayStation, and the like.

Other suitable devices include any smartphone or any mobile phone that has computing capabilities, such as a Blackberry from Research in Motion (RIM), an iPhone from Apple Inc., an Android from Google, and the like. Other suitable devices include a tablet computing device such as a Kindle Fire from Amazon, a Blackberry Playbook from Research in Motion, an iPad from Apple, a Galaxy from Samsung, and the like.

Example Shared-Application Tool

Figure 2:
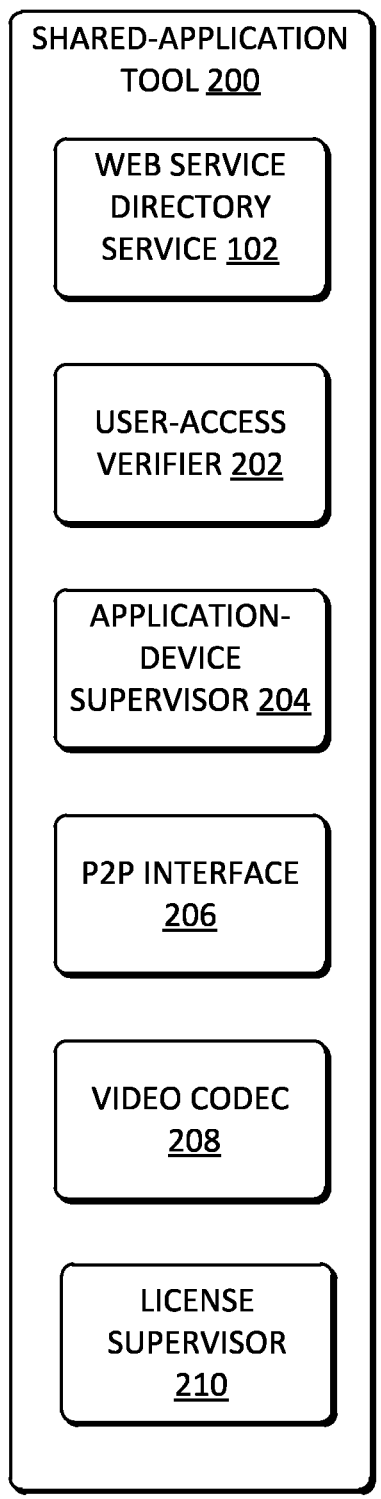
FIG. 2 illustrates an example shared-application tool according to one or more implementations described herein.

FIG. 2 illustrates an example shared-application tool 200 that permits a user of one computing device to use an application that is installed and running on another computing device according to one or more implementations described herein. The illustrated shared-application tool 200 includes the web service directory service 102, a user-access verifier 202, an application-device supervisor 204, a peer-to-peer (P2P) interface 206, a video codec 208, and a license supervisor 210.

In one or more implementations, the user-access verifier 202 receives the selection of the word processing application from the user 124 (i.e., when the user 124 clicks on the icon 120) and determines whether the user 124 has permission to use the word processing application. For example, the user 124 clicks on the icon 120 and the user-access verifier 202 compares the login name and password entered on the laptop 110 by the user 124 to the login name and password assigned to the desktop 108. In one or more implementations, the user-access verifier 202 compares the email address of the user 124 to the email address assigned to the user of the desktop 108. If the login name, password, and/or email addresses match, the user 124 is permitted to access the word processing application.

If the login name, password, and/or email addresses do not match, the user-access verifier 202 consults the directory service 102 to determine whether the user 124 has permission to use the word processing application. The directory service 102 consults the registration information for the laptop 110 and informs the user-access verifier 202 that the laptop 110 has permission to access the word processing application.

In one or more implementations, the application-device supervisor 204 determines from which computing device it is better to run the word processing application. For example, the application-device supervisor 204 extracts metrics such as processor computing capabilities, memory capabilities, device load, network speed, and other metrics from the desktop 108 and the laptop 110 (as well as the desktops 104 and 106, if they have the word processing application installed on them) and determines from which device the word processing application is better suited to run.

In one or more implementations, the application-device supervisor 204 includes a script that calculates processor computing capabilities in intervals, such as ten seconds, twenty seconds, thirty seconds, forty seconds, one minute, etc., to determine the how much processor computing capability exists on the desktop 108 and the laptop 110. To determine network speed, the application-device supervisor 204 pings TURN relay servers at regular intervals to gather network latency statistics.

In one or more implementations, the operating systems (OS) in the desktop 108 and the laptop 110 provide statistics to the application-device supervisor 204 about computing resources, load, etc., for the desktop 108 and the laptop 110. In one or more implementations, the application-device supervisor 204 measures the performance of the communication stream between itself and the remote client computing device.

In one or more implementations, the desktop 108 and the laptop 110 include the peer-to-peer (P2P) interface 206. The P2P interface 206 sets up peer-to-peer communication between the laptop 110 and the desktop 108 so that the user 124 of the laptop 110 can use the word processing application that is installed on the desktop 108.

In one or more implementations, the P2P interface 206 implements a P2P protocol such as libjingle. Libjingle is an open source library that is used to build peer-to-peer connections for file-sharing, voice, video, and other peer-to-peer communications. Libjingle handles connection negotiation and data exchange between peer client devices that is used create a network connection, negotiate session details, and exchanging data. Libjingle also parses Extensible Markup Language (XML) and handles network proxies. Libjingle uses a variety of transport mechanisms, such as Transmission Control Protocol (TCP), Universal Datagram Protocol (UDP), Real-Time Transport Protocol (RTP), and in-band Extensible Messaging and Presence Protocol (XMPP).

In one or more implementations, libjingle implements an interactive connectivity establishment (ICE) protocol to set up peer-to-peer communication sessions. For example, libjingle uses Traversal Using Relay Network Address Translation (TURN) protocol to set up a peer-to-peer communication session that uses a relay server as an intermediary. Alternatively, libjingle uses Session Traversal Utilities for Network Address Translators (STUN) protocol to set up a peer-to-peer communication session.

In one or more implementations, the P2P interface 206 exchanges STUN binding request and response messages between the desktop 108 and the laptop 110. In one or more implementations, the P2P interface 206 exchanges TURN allocate request and response messages between desktop 108 and the laptop 110.

In one or more implementations, the P2P interface 206 on the desktop 108 includes a daemon, which facilitates setting up the P2P communication session with the laptop 110. For example, the daemon reports the status of the desktop 108, e.g., whether the desktop 108 awake, reachable, etc. The daemon also reports whether or not the desktop 108 has a port that can be connected to by the laptop 110 for the P2P communication session. The daemon also maintains the communication for the duration of the use of the word processing application by the laptop 110.

In one or more implementations, P2P interface 206 on the desktop 108 also includes an extension. The extension is used to connect the desktop 108 to the laptop 110. The extension includes the messages for the P2P interface 206 to communicate with the browser on the desktop 108. The extension includes hooks that tie into the Extensible Messaging and Presence Protocol (XMPP) for STUN and TURN libjingle sessions.

In one or more implementations, the extension also includes hooks that tie into the user interface (UI) elements to enable the video codec 208 on the desktop 108 to capture the UI inputs.

Alternatively, an implementation of the P2P interface 206 may use any protocol that functions to set up a peer-to-peer connection, such as Skype, for example.

In one or more implementations, the video codec 208 is any suitable video codec that encodes and/or compresses digital and/or analog video into a video stream. The video codec also is any suitable video codec that decodes and/or decompresses a digital video stream. Suitable video codecs include H.264 codecs, VP8 codecs, Motion Picture Experts Group (MPEG) codecs, or the like.

In one or more implementations, the video codec 208 enables the user 124 to use the word processing application on the laptop 110 even though the word processing application is installed and running on the desktop 108. For example, the word processing application is installed and running on the desktop 108 but the laptop 110 renders the word processing application so the user 124 can use the word processing application on the laptop 110. The video codec in concert with the P2P interface 206 enables the word processing application to run on the desktop 108 and render on the laptop 110.

In one or more implementations, when the word processing application is running on the desktop 108, the video codec 208 captures the user interface (UI) output (i.e., what is displayed on the screen of the desktop 108) from the word processing application that is running on the desktop 108. The video codec 208 encodes the captured UI output as a video stream and transmits the encoded video stream to the laptop 110. The laptop 110 renders the encoded video stream.

In one or more implementations, the video codec 208 captures the UI inputs on the laptop 110, such as mouse movements, mouse clicks, key presses on the keyboard, etc., encodes them as a video stream, and transmits the encoded video stream to the desktop 108. The video codec 208 plays the mouse movements, mouse clicks, key presses on the keyboard, etc., that are encoded in the video stream on the desktop 108.

In one or more implementations, the shared-application tool 200 on the desktop 108 includes an extension that is used to connect the desktop 108 to the laptop 110. The extension includes the messages for the P2P interface 206 to communicate with the browser on the desktop 108. In one or more implementations, the extension includes hooks that tie into the Extensible Messaging and Presence Protocol (XMPP) for STUN and TURN libjingle sessions. In one or more implementations, the extension also includes hooks that tie into the UI elements to enable the video codec 208 on the desktop 108 to capture the UI inputs from the desktop 108.

In one or more implementations, the extension also includes hooks that tie into the user interface (UI) elements to enable the video codec 208 on the laptop 110 to capture the UI inputs when the user 124 is manipulating the word processing application.

In one or more implementations, the video codec 208 decodes the video stream transmitted to the laptop 110 by the desktop 108. The extension also includes a receiver that the video codec 208 uses to receive the encoded video stream from the desktop 108.

In one or more implementations, the licensing supervisor 210 supervises allocation of application licenses among user devices. For example, the licensing supervisor 210 unregisters one or more registered licenses from one or more user computing devices when the user closes out of an application.

The licensing supervisor 210 then makes the released application available for another user. In one or more implementations, the licensing supervisor 210 presents an icon for the released application on user computing devices that have access to the released application. A user can then click on the icon to launch the released application. When the user clicks on the icon, the licensing supervisor 210 re-registers the released license to the new user computing device and icons on other computing devices are removed until the license is again unregistered.

Example Application-Device Supervisor

Figure 3:
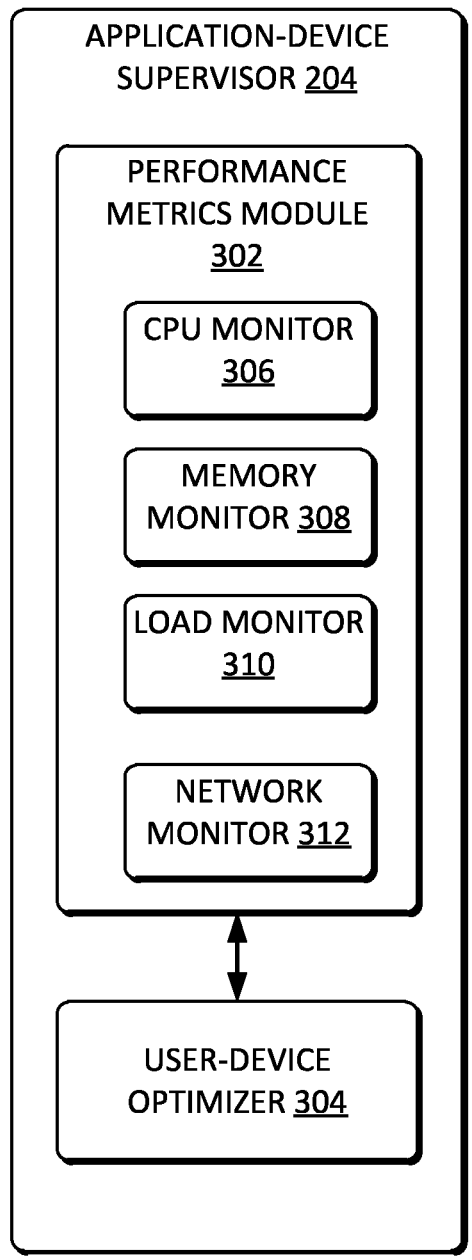
FIG. 3 illustrates an example application-device supervisor according to one or more implementations described herein.

FIG. 3 illustrates an example the application-device supervisor 204 according to one or more implementations described herein, that uses metrics of the computing devices to determine on which computing device the selected application will run. In the illustrated implementation, the application-device supervisor 204 includes a performance metrics module 302 and a user-device optimizer 304. The illustrated performance metrics module 302 includes a central processing unit (CPU) monitor 306, a memory monitor 308, a load monitor 310, and a network monitor 312.

In one or more implementations, the application-device supervisor 204 determines from which computing device it is better to run a selected application. For example, the application-device supervisor 204 extracts metrics such as device processor computing capabilities, memory capabilities, device load, network speed, and other metrics from the computing devices in the environment 100 and determines from which device the selected application is better suited to run.

In one or more implementations, the application-device supervisor 204 uses trial and error and/or heuristics to determine which computing device would be the better choice from which to run the application. The application-device supervisor 204 is adaptive, constantly tweaking itself with new statistics on computing device/network status.

In some implementations, the application-device supervisor 204 selects the computing device that has the best performance for the selected application using a database that includes the statistics about the computing devices that do not change over time. In this and other implementations, the application-device supervisor 204 uses the database to determine from which computing device it is best to run the selected application.

In one or more implementations, the performance metrics module 302 extracts metrics from the desktops 104, 106, 108, and the laptop 110.

In one or more implementations, the user-device optimizer 304 obtains the metrics extracted by the performance metrics module 302 and determines the optimal computing device from which to run the selected application.

In one or more implementations, the CPU monitor 306 includes a script that calculates processor computing capabilities in intervals, such as ten seconds, twenty seconds, thirty seconds, forty seconds, one minute, etc., to determine the how much processor computing capability exists one or more of the computing devices. For example, the CPU monitor 306 includes a script that calculates processor computing capabilities in intervals, such as ten seconds, twenty seconds, thirty seconds, forty seconds, one minute, etc., to determine the how much processor computing capability exists on the desktops 104, 106, 108, and the laptop 110.

In one or more implementations, the operating systems (OSs) in the computing devices provide statistics to the CPU monitor 306 about computing resources for the computing devices, such as the desktops 104, 106, 108, and the laptop 110.

In one or more implementations, the memory monitor 308 extracts memory capability metrics from the computing devices. The memory monitor 308 determines from which computing device the selected application is better suited to run based on memory capabilities. In one or more implementations, a daemon on the desktop 108 reports the memory status of the desktop 108. In one or more implementations, an extension on the laptop 110 reports the memory status of the laptop 108.

In one or more implementations, the load monitor 310 extracts load statistics from the client computing devices. The load monitor 310 determines from which computing device the selected application is better suited to run based on device load. In one or more implementations, a daemon on the desktop 108 reports the load status of the desktop 108. In one or more implementations, an extension on the laptop 110 reports the load status of the laptop 110.

In one or more implementations, the network monitor 312 extracts network statistics from the computing devices. The network monitor 312 determines network speed by pinging TURN relay servers at regular intervals to gather network latency statistics. In one or more implementations, the network monitor 312 is an extension on the laptop 110 that measures the performance of the communication stream between itself and the desktop 108.

Example Method for Sharing Applications

Figure 4:
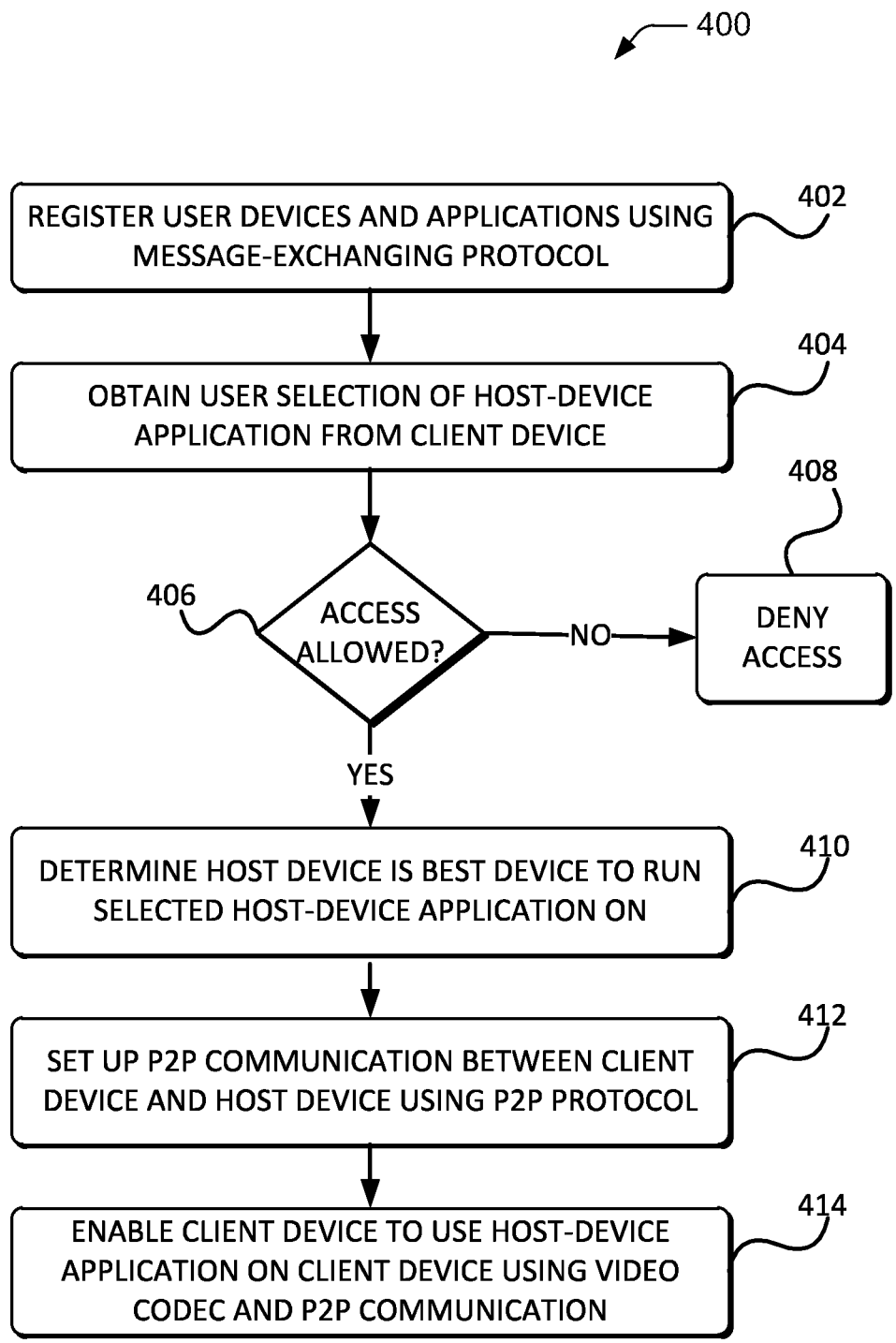
FIG. 4 is a flowchart of a method for sharing applications according to one or more implementations described herein.

FIG. 4 is a flowchart of a method 400 of a method for sharing an application with another computing device using the shared-application tool 200 according to one or more implementations described herein.

In a block 402, the shared-application tool 200 registers user devices and applications using a message-exchanging protocol. In one or more implementations, the desktops 104, 106, and 108, and the laptop 110 and their installed applications are registered with the directory service 102 by exchanging messages with the directory service 102. For example, the desktops 104, 106, and 108, the laptop 110, as well as other computing devices in the environment 100 register their processor type and speed, memory type and amount, installed applications, etc., with the directory service 102.

In a block 404, shared-application tool 200 obtains a user selection of a host-device application from a client device. In one or more implementations, the user 124 of the laptop 110 clicks on the icon 120 for the word processing application. The directory service 102 receives an indication that the user 124 has selected the word processing application and interprets the selection of the icon 120 as a request to use the word processing application. Alternatively, the user 124 of the laptop 110 clicks on the icon 126 for the word processing document. The directory service 102 receives an indication that the user 124 has selected the word processing document and interprets the selection of the icon 126 as a request to use the word processing application.

In a block 406, the shared-application tool 200 determines whether the user has permission to access the selected application. In one or more implementations, the user-access verifier 202 determines whether the user 124 has permission to access the word processing application. If the user-access verifier 202 determines the user 124 does not have permission to access the word processing application, then control of the method 400 passes to a block 408, in which the user is denied access to the word processing application. In one or more implementations, user access is denied if the number of licenses to the selected application that the environment 100 holds has been reached. Access to the selected application is denied until a license is unregistered when the selected application is released by a user by closing out of the application.

If the user-access verifier 202 determines the user 124 does not have permission to access the word processing application, then control of the method 400 passes to a block 410, in which the shared-application tool 200 determines whether the host device is the best device from which to run the selected application. In one or more implementations the application-device supervisor 204 determines from which computing device it is better to run the word processing application. For example, the application-device supervisor 204 extracts metrics such as processor computing capabilities, memory capabilities, device load, network speed, and other metrics from the desktop 108 and the laptop 110 (as well as the desktops 104 and 106, if they have the word processing application installed on them) and determines from which device the word processing application is better suited to run. For purposes of explanation, assume that the application-device supervisor 204 determines that it is best to run the word processing application from the desktop 108.

In a block 412, the shared-application tool 200 sets up peer-to-peer communication between the client device and the host device using a peer-to-peer communication protocol. In one or more implementations, the P2P interface 206 sets up a peer-to-peer connection between the laptop 110 and the desktop 108 using libjingle, Skype, or other suitable P2P communication protocol.

In a block 414, the shared-application tool 200 enables the client device to use the host-device application on the client device using a video codec and P2P communication. In one or more implementations, the shared-application tool 200 uses the P2P interface 206 to set up and maintain a peer-to-peer session between the desktop 108 and the laptop 110. In one or more implementations, the shared-application tool 200 uses the video codec 208 to transmit and receive data between the desktop 108 and the laptop 110 to enable the user 124 of the laptop 110 to use the word processing application on the laptop 110 while the word processing application is running on the desktop 108.

The method 400 is illustrated as a collection of blocks in a logical flow graph, which represents a sequence of operations that can be implemented in mechanics alone or a combination with hardware, software, and/or firmware. In the context of software/firmware, the blocks represent instructions stored on one or more computer-readable storage media that, when executed by one or more processors, perform the recited operations. Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

Example Computing Environment

Figure 5:
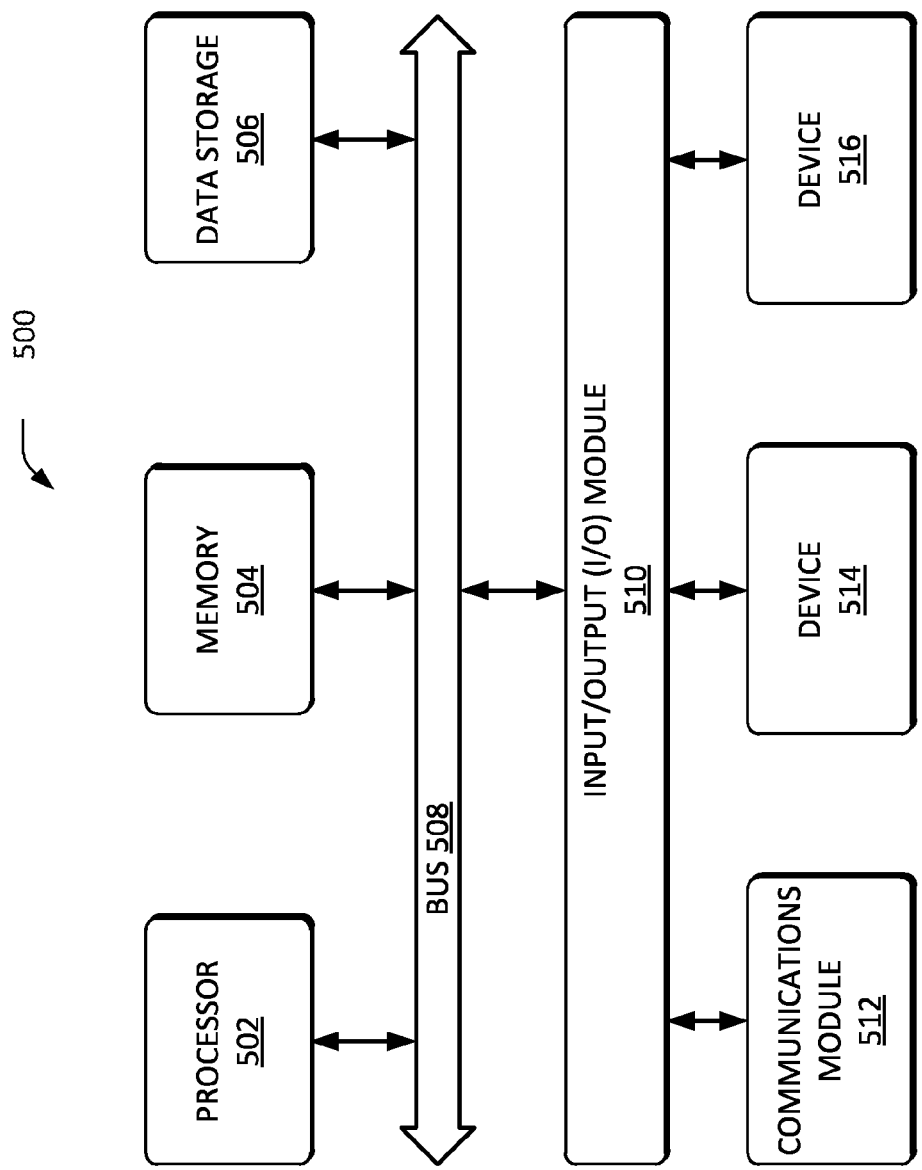
FIG. 5 is a high-level block diagram illustrating an example computer system suitable for implementing the technology described herein.

FIG. 5 is a high-level block diagram illustrating an example computer system 600 suitable for implementing the shared-application environment 100 of FIG. 1. In certain aspects, the computer system 500 may be implemented using hardware or a combination of software and hardware.

The illustrated computer system 500 includes a processor 502, a memory 504, and data storage 506 coupled to a bus 508 or other communication mechanism for communicating information. An input/output (I/O) module 510 is also coupled to the bus 508. A communications module 512, a device 514, and a device 516 are coupled to the I/O module 510.

The processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The processor 502 may be used for processing information. The processor 502 can be supplemented by, or incorporated in, special purpose logic circuitry.

The memory 504 may be Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device used for storing information, a computer program, and/or instructions to be executed by the processor 502. They memory 504 may store code that creates an execution environment for one or more computer programs used to implement technology described herein.

A computer program as discussed herein does not necessarily correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

Unless indicated otherwise by the context, a module refers to a component that is hardware, firmware, and/or a combination thereof with software (e.g., a computer program.) A computer program as discussed herein does not necessarily correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The instructions may be implemented in one or more computer program products, i.e., one or more modules of computer program instructions encoded on one or more computer readable media for execution by, or to control the operation of, the computer system 500, and according to any method well known to those of skill in the art. The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM))

The data storage 506 may be a magnetic disk or optical disk, for example. The data storage 506 may function to store information and instructions to be used by the processor 502 and other components in the computer system 500.

The bus 508 may be any suitable mechanism that allows information to be exchanged between components coupled to the bus 508. For example, the bus 508 may be transmission media such as coaxial cables, copper wire, and fiber optics, optical signals, and the like.

The I/O module 510 can be any input/output module. Example input/output modules 510 include data ports such as Universal Serial Bus (USB) ports.

The communications module 512 may include networking interface cards, such as Ethernet cards and modems.

The device 514 may be an input device. Example devices 514 include a keyboard, a pointing device, a mouse, or a trackball, by which a user can provide input to the computer system 500.

The device 516 may be an output device. Example devices 516 include displays such as cathode ray tubes (CRT) or liquid crystal display (LCD) monitors that display information, such as web pages, for example, to the user.

One or more implementations are described herein with reference to illustrations for particular applications. It should be understood that the implementations are not intended to be limiting. Those skilled in the art with access to the teachings provided herein will recognize additional modifications, applications, and implementations within the scope thereof and additional fields in which the technology would be of significant utility. In the above description of example implementations, for purposes of explanation, specific numbers, materials, configurations, and other details are set forth in order to better explain implementations as claimed. However, it will be apparent to one skilled in the art that the claims may be practiced using details different than the examples described herein. In other instances, well-known features are omitted or simplified to clarify the description of the example implementations.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

In the claims appended herein, the inventor invokes 35 U.S.C. §112, paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. §112, paragraph 6.

What is claimed is:

1. A system, comprising:
one or more processors; and
a machine-readable medium comprising instructions stored therein, which when executed by the one or more processors, cause the one or more processors to perform operations comprising:
processing, via a message-exchanging communication protocol, registration information received from a client computing device, a plurality of host computing devices, and an application installed on each of the plurality of host computing devices, the registration information from each of the plurality of host computing devices indicating metrics of the host computing device and whether the host computing device is reachable for a peer-to-peer communication session;
receiving a request from the client computing device for access to the application;
selecting, in response to receiving the request for access to the application, a first host computing device among the plurality of host computing devices to run the application based on metrics of the plurality of host computing devices, the metrics indicating that a processor computing capability of the first host computing device is greater than respective processor computing capabilities of other host computing devices from the plurality of host computing devices; and
providing, in response to selecting the first host computing device to run the application among the plurality of host computing devices, an identifier of the first host computing device to the client computing device, the identifier indicating a port of the first host computing device when the registration information indicates that the first host computing device is reachable for the peer-to-peer communication session, the peer-to-peer communication session between the client computing device and the first host computing device being established through the port using a peer-to-peer communication protocol for access to the application on the client computing device while the application is running on the first host computing device.

2. The system of claim 1, wherein the operations further comprise determining whether a user of the client computing device has permission to use the application.

3. The system of claim 1, wherein the message-exchanging communication protocol includes Extensible Messaging and Presence Protocol (XMPP).

4. The system of claim 1, wherein the metrics include one or more of a memory capability, a processor capability, load statistics, or network speed statistics of the client computing device and the plurality of host computing devices.

5. The system of claim 1, wherein the operations further comprise extracting one or more of the metrics from the client computing device and at least one of the plurality of host computing devices.

6. The system of claim 1, wherein the operations further comprise accessing a database that includes statistics for one or more of the metrics of the client computing device and the plurality of host computing devices.

7. The system of claim 1, wherein the operations further comprise processing the metrics to generate statistical information about the client computing device and the plurality of host computing devices.

8. The system of claim 1, wherein the client computing device is assigned to a first user and the first host computing device is assigned to a second user.

9. The system of claim 1, wherein the client computing device and the first host computing device are assigned to a same user.

10. The system of claim 1, wherein the peer-to-peer communication protocol includes libjingle.

11. The system of claim 1, wherein the access to the application through the peer-to-peer communication session is enabled using a video codec of the first host computing device.

12. The system of claim 1, wherein the operations further comprise:
processing registration information of a license for the application,
determining that a user of the client computing device ceased use of the application, and
processing deregistration information for the license when the user of the client computing device releases the application by ceasing use of the application.

13. A method, comprising:
processing, via a message-exchanging communication protocol, registration information received from a client computing device, a plurality of host computing devices, and an application installed on each of the plurality of host computing devices, the registration information from each of the plurality of host computing devices indicating metrics of the host computing device and whether the host computing device is reachable for a peer-to-peer communication session;
receiving a request, via the message-exchanging communication protocol, from the client computing device for access to the application;
determining that a user of the client computing device has permission to use the application;
selecting, in response to determining that the user has permission to use the application, a first host computing device among the plurality of host computing devices to run the application based on metrics of the plurality of host computing devices, the metrics indicating that a processor computing capability of the first host computing device is greater than respective processor computing capabilities of other host computing devices from the plurality of host computing devices; and
providing, in response to selecting the first host computing device to run the application among the plurality of host computing devices, an identifier of the first host computing device to the client computing device, the identifier indicating a port of the first host computing device when the registration information indicates that the first host computing device is reachable for the peer-to-peer communication session, the peer-to-peer communication session between the client computing device and the first host computing device being established through the port using a peer-to-peer communication protocol.

14. The method of claim 13, wherein the metrics include one or more of a memory capability, a processor capability, load statistics, or network speed statistics of the client computing device and the plurality of host computing devices.

15. The method of claim 13, further comprising extracting one or more metrics from the client computing device and at least one of the plurality of host computing devices.

16. The method of claim 13, further comprising processing the metrics to generate statistical information about the client computing device and the plurality of host computing devices.

17. The method of claim 13, wherein the message-exchanging communication protocol includes Extensible Messaging and Presence Protocol (XMPP).

18. The method of claim 13, wherein the peer-to-peer communication protocol includes libjingle.

19. A non-transitory computer-readable medium comprising processor-executable instructions that when executed by one or more processors cause the one or more processors to perform operations comprising:
processing; via a message-exchanging communication protocol, registration information received from a client computing device, a plurality of host computing devices, and an application installed on each of the plurality of host computing devices, the registration information from each of the plurality of host computing devices indicating metrics of the host computing device and whether the host computing device is reachable for a peer-to-peer communication session;
receiving a request from the client computing device for access to the application;
determining that a user of the client computing device has permission to use the application;
selecting, in response to determining that the user has permission to use the application, a first host computing device among the plurality of host computing devices to run the application based on metrics of the plurality of host computing devices, the metrics indicating that a processor computing capability of the first host computing device is greater than respective processor computing capabilities of other host computing devices from the plurality of host computing devices; and
providing, in response to selecting the first host computing device to run the application among the plurality of host computing devices, an identifier of the first host computing device to the client computing device, the identifier indicating a port of the first host computing device when the registration information indicates that the first host computing device is reachable for the peer-to-peer communication session, the peer-to-peer communication session between the client computing device and the first host computing device being established through the port using a peer-to-peer communication protocol.

20. The non-transitory computer-readable medium of claim 19, wherein the metrics include one or more of a memory capability, a processor capability, load statistics, or network speed statistics of the client computing device and the plurality of host computing devices.

21. The non-transitory computer-readable medium of claim 19, wherein the operations further comprise extracting one or more metrics from the client computing device and at least one of the plurality of host computing devices.

22. The non-transitory computer-readable medium of claim 19, wherein the operations further comprise processing the metrics to generate statistical information about the client computing device and the plurality of host computing devices.

23. The non-transitory computer-readable medium of claim 19, wherein the message-exchanging communication protocol includes Extensible Messaging and Presence Protocol (XMPP).

24. The non-transitory computer-readable medium of claim 19, wherein the peer-to-peer communication protocol includes libjingle.

25. The system of claim 1, wherein the operations further comprise:
providing an icon associated with the application for display on the client computing device when the client computing device has available access to the application; and
causing the icon to be removed from the client computing device when a second client computing device accesses the application, the icon being removed from display on the client computing device until a license for the application is deregistered from the second client computing device and available for reregistration.

26. The system of claim 1, wherein the processor computing capability is determined by a script that calculates the processor computing capability at regular intervals of time.

27. The system of claim 1, wherein the metrics associated with the first host computing device further comprise a network speed of the first host computing device, the network speed being determined by pinging one or more relay servers at regular intervals of time to determine network latency statistics.

* * * * *